United States Patent [19]

Gerry

[11] 4,009,491  
[45] Feb. 22, 1977

[54] DISTORTIONLESS MODULATION HEAD

[76] Inventor: Martin E. Gerry, 13452 Winthrope St., Santa Ana, Calif. 92705

[22] Filed: June 6, 1975

[21] Appl. No.: 584,399

Related U.S. Application Data

[60] Division of Ser. No. 501,037, Aug. 28, 1974, which is a continuation-in-part of Ser. No. 377,581, July 9, 1973, Pat. No. 3,862,115.

[52] U.S. Cl. .................................. 360/125; 360/119
[51] Int. Cl.² ...................... G11B 5/12; G11B 5/25
[58] Field of Search .......... 360/110, 111, 125, 127, 360/119, 120, 123, 66, 30

[56] References Cited

UNITED STATES PATENTS

| | | | |
|---|---|---|---|
| 1,218,324 | 3/1917 | Severy | 360/125 |
| 2,933,721 | 4/1960 | Hagopian | 360/125 |
| 3,017,617 | 1/1962 | Quade | 360/125 |
| 3,230,517 | 1/1966 | Supernowicz | 360/123 |
| 3,453,399 | 7/1969 | Reijnders | 360/111 |
| 3,634,632 | 1/1972 | Watson | 360/123 |
| 3,651,278 | 3/1972 | Chupity | 360/125 |
| 3,681,526 | 8/1972 | Camras | 360/33 |
| 3,881,192 | 4/1975 | Ballinger | 360/123 |

*Primary Examiner*—Robert S. Tupper

[57] ABSTRACT

A magnetic head with capability of eliminating or attenuating distortion having a magnetizable core and coil means formed thereon. Some cores have cavities internal thereto, one has no cavity and another has a window therein. All cores are tapered and most have an aperture or bore extending into the cores. In the record mode, coil means used for application of a carrier frequency to the head may have capacitive and inductively reactive components at resonance to each other. In the reproduce mode, either of the coils may be used to connect to external electronics. Advantage is gained by use of the carrier frequency coil having the reactive components since these components are at resonance to the carrier frequency signal previously recorded and hence the reproduced signal is at higher magnitude.

12 Claims, 12 Drawing Figures

DISTORTIONLESS MODULATION HEAD

CROSS-REFERENCE TO RELATED PATENTS

This application is a division of copending application Ser. No. 501,037 filed Aug. 28, 1974.

Application Ser. No. 501,037 is a continuation-in-part of a then copending application Ser. No. 377,581, filed July 9, 1973, now Pat. No. 3,862,115 which is incorporated by reference herein for the theoretical background given therein for modulation heads wherein modulation is obtained by means of the nonlinear characteristic of the magnetizable core.

BACKGROUND OF THE INVENTION

This invention is in the field of magnetic heads and in particular heads that reduce the various components of distortion encountered in recording, and retrieved during reproduction.

U.S. Pat. No. 2,933,721 has magnetic core without magnetic discontinuities therein. However this patent does not take cognizance of the importance of the coil coupling, nor are coils provided with both inductive and capacitive components in the carrier frequency circuit at resonance to a predetermined carrier frequency.

U.S. Pat. No. 3,651,282 to same applicant for a distortionless head also does not take into consideration coil coupling where the coupling coefficient is between 0.9 and 1, and also does not treat resonance of reactive components of the carrier frequency coil, as well as not showing that coils may be formed around the entire girth of the core without having to wind them on legs of the core.

SUMMARY OF THE INVENTION

All the shortcomings and defects of the prior art as exmplified in the background section herein are corrected by the instant invention.

Accordingly, a magnetic head is provided which is simple to manufacture. The head has windings to which carrier and intelligence signals are applied, and an elongated magnetizable core with reactive means and a coil formed thereon. The reactive means constitutes inductive and capacitive components at resonance to a predetermined carrier frequency. The coil is responsive to intelligence signals of differing waveforms.

The fluxes produced by carrier and intelligence current, flowing respectively in the reactive means and coil, interact in the core to produce a total flux comprised of conduction flux, displacement flux and convection flux components. The convention flux component is the usable component for recording on an external recording media.

In these heads, cores are provided, some of rhombohedral shape and others of cylindrical shape. Both are tapered on one end. In the rhombohedral cores, one has a window at the broad face thereof and an aperture at the narrow end extending through the wall of the core to the window. Another core of rhombohedral shape has a bore extending partially into the core. Both the bore and the window act as cavities, their inner surfaces being electrified and the convention flux used for recording emanating from the aperture and bore. Another core of cylindrical shape having a tapered end is of solid or homogeneous magnetizable material without a bore therein.

In the head having the core with the window and the homogenous core, a shield of magnetic material can be used to restrict convention flux other than from the tips of these cores. The other cores are self shielding.

In the reproduce mode, normal usage of the coil used for applying intelligence during recording mode, provides intelligence output signals. However, the coil with the reactive components may be used to advantage since these reactive components are at resonance to the recorded carrier bearing the intelligence, a higher signal level output can be expected.

DETAILED DESCRIPTION

Figure 1:
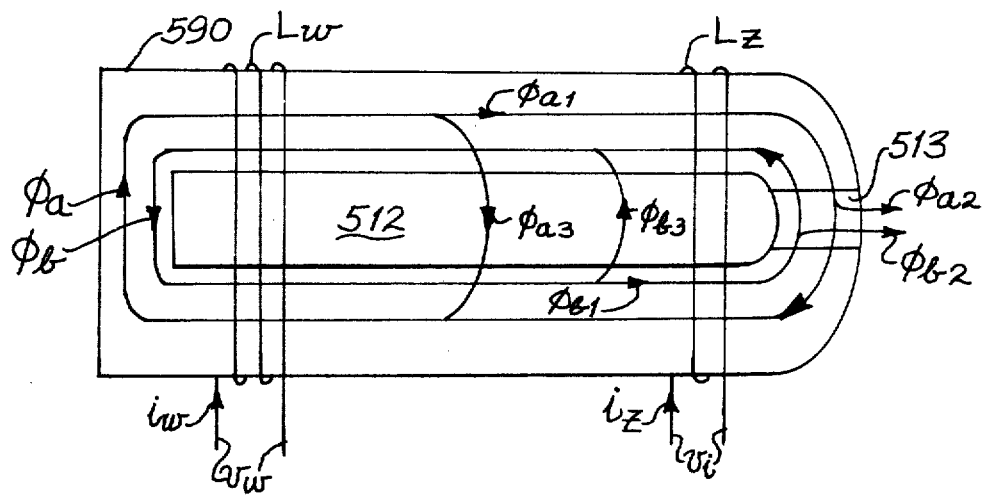
FIG. 1 is a schematic view of a recording head with the coils wound thereon about the outer periphery of the elongated core. The carrier frequency coil formed or intergral therewith may be resonated to an applied carrier frequency by means of a capacitor in series, in parallel with such coil, or the coil may be wound or formed with flat metallic ribbon having an insulation layer on one side thereof to provide sufficient capacitance for resonating the inductive component of the carrier coil at the carrier frequency, or a combination of external capacitor and/or inherent internal capacitance is used to effect such resonance.

Referring to FIG. 1, the schematic representation thereof for head configurations having independent coils for handling carrier and intelligence signals, enables several of the flux paths to be conveniently illustrated.

Coils $L_w$ and $L_z$ are provided, formed about the outer periphery or girth of magnetizable core 590. Core 590 has a cavity 512 within itself, and an aperture or non-magnetizable metallic or plastic filler at 513 in line with the principal lengthwise axis of cavity 512.

A radio frequency voltage $v_w$ is generally applied across the terminals of coil $L_w$ creating a current $i_w$ in coil $L_w$ which creates magnetic flux component $\phi_a$. Though $v_w$ is generally of sinusoidal form, there is no reason why a high frequency repetitive rectangular or triangular wave or the like cannot be used under proper electronic demodulation conditions external to the head.

Intelligence signal voltage $v_i$ is applied across coil $L_z$ creating current $i_z$ in coil $L_z$ which creates magnetic flux $\phi_b$.

No matter in which direction fluxes $\phi_a$ and $\phi_b$ are arranged to flow, each of these fluxes, may prior to consideration of their interaction, be treated as being broken up into several components, as shown in equation (1), so that in terms of the recording flux all components will be comprised of $\phi_{a2}$ and $\phi_{b2}$ which have interacted with each other in the core of the head, and due to the core's non-linear characteristics, provide an amplitude modulated signal, in accordance with the power series stated in equation (1).

Fluxes $\phi_{a2}$ and $\phi_{b2}$ have been assigned a positive sense each, which means they will have the same direction of flow, while the other subcomponents may either cancel or keep circulating in the body of the core, for a limited time period. In terms of the total flux $\phi_x(t)$ variously defined as to form in the incorporated reference, the total flux herein may be stated as:

$$\phi_x(t) = [\phi_a+\phi_b] + \tfrac{1}{2}![\phi_a+\phi_b]^2 + \tfrac{1}{3}![\phi_a+\phi_b]^3 + \tfrac{1}{4}![\phi_a+\phi_b]^4 + \ldots$$

where, $$\phi_a = \phi_{a1} + \phi_{a2} + \phi_{a3}$$

$$\phi_b = \phi_{b1} + \phi_{b2} + \phi_{b3} \qquad (1)$$

Equation (1) is analogous to equation (16) of US Pat. 3,651,282. Modulation components of the flux are generally an array of products of intelligence and carrier signals. In equation (1), the flux components have included therein their respective mutual fluxes and hence their coupling coefficients are residual in such fluxes. The effect of modulation of a carrier component by an intelligence component is therefore determined by expansion of the infinite power series of equation (1).

Flux components $\phi_{a2}$ and $\phi_{b2}$ are the particular components that account for the recording flux and constitute convention fluxes. In order to analyze the various fluxes, which are time and space related, it is necessary to stop the clock, so to speak, and trace the flux components in terms of their spatial relationships.

First, when a unit of flux is established in a core, there is a conduction of that unit of flux in the core. That is, the unit of flux flows in the core. That unit of flux will be displaced as it moves through the core to a surface of the core, such as the surface of the cavity. The displaced unit of flux or a portion thereof will encounter another media, such as air in the cavity after the surface in the cavity has been electrified by the displaced unit of flux. A portion of that unit of flux leaving the surface, the convection portion, will in-part return to the core, wheras another convection portion, the one of interest, will leave the core. In FIG. 1 illustration, this portion will leave the cavity through aperture 513. Though shown as two separate convection components for convenience of discussion, $\phi_{a2}$ and $\phi_{b2}$ comprise an intermodulation convection flux component, amplitude modulated by virtue of the non-linear character of the core.

It should be understood that even though the several components of the flux created in the core due to carrier and intelligence currents flowing in the respective coils of the core are shown individually, they are individual in the time sense but not in the space sense.

Flux components $\phi_{a3}$ and $\phi_{b3}$ are those portions of the unit flux that are displaced from the conduction flux portions $\phi_{a1}$ and $\phi_{b1}$. Displaced fluxes electrify the inner cavity surface 512 of the core and resultant convection fluxes in part are returned to the core and in part find their way out through aperture or non-magnetic filler at 513. The flux at 513 is for convenience termed $\phi_{a2}$ and $\phi_{b2}$ identifying their respective origins as to carrier or intelligence contribution. To repeat for emphasis, through shown as individual flux components, these components are really one flux occurring due to intermodulation of intelligence and carrier fluxes, and the convection component is a portion of the total flux $\phi_x(t)$.

Figure 5:
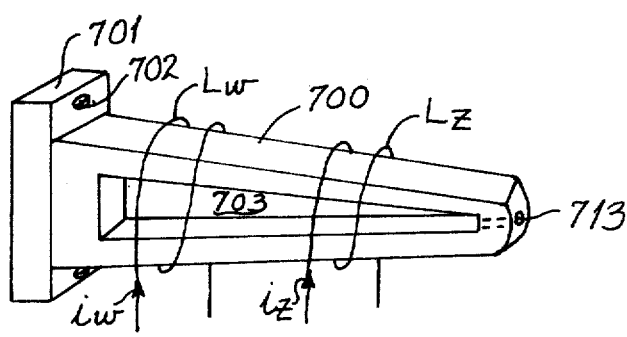
FIG. 5 is a perspective view of a head having an open window in the core and an aperture at the tip of the core and the coils wound about the outer periphery of the elongated core. The capcitance in accordance with FIGS. 2, 3 and/or 4 may be part of this structure.
Figure 6:
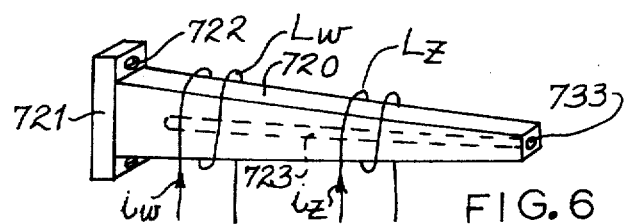
FIG. 6 is a perspective view of a head having an elongated core with a cavity internal to the core and an aperture at the tip of the core extending into the cavity. Coils are formed about the periphery of the elongated core. The capacitance in accordance with FIGS. 2, 3, and/or 4 may be part of this structure.
Figure 7:
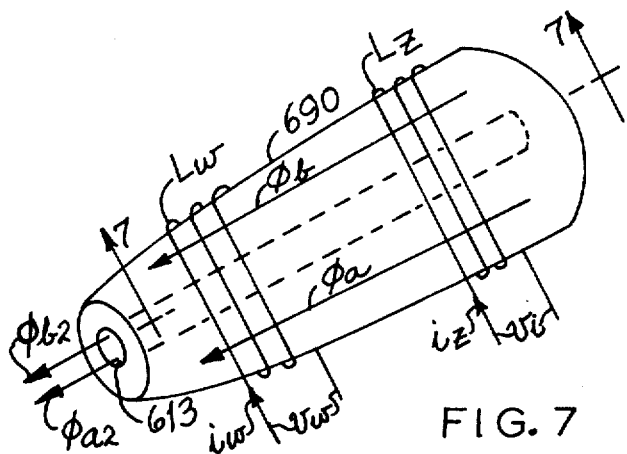
FIG. 7 is a perspective view of a head having a core with a central bore extending from the tip of the core internal to the core a predetermined distance. Coils are wound about the periphery of the elongated core. The capacitance in accordance with FIGS. 2, 3 and/or 4 may be part of this structure.
Figure 8:
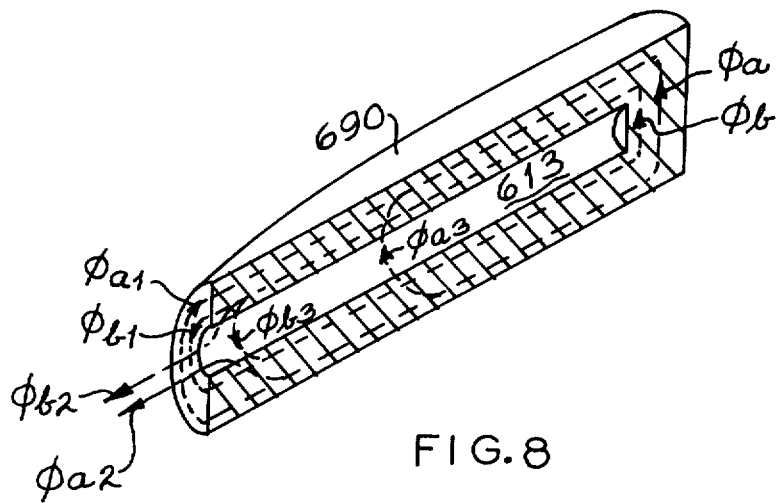
FIG. 8 is a perspective view taken at plane 7—7 of FIG. 6 so as to enable showing the several flux component paths in connection therewith.

In other configurations, the cavities involved are designated at 703 in FIG. 5 which for greater efficiency of flux transfer may use a shield enveloping all but the tip of the core. In FIG. 6, the cavity is a bore at 723 terminating at narrowed portion of the core at 733. In FIG. 7 or FIG. 8, the cavity is a bore at 613, and in FIG. 9 the cavity is a bore at 813. The place where the recording or convection flux will emanate from the other several cores are the core tips such as at 713, 733, 613, 813 and 913. In FIG. 10, since there is no internal cavity provided, convection flux will be available at all points on the outer core surface 900 and at flange 901 surface. Hence in this figure it would be advantageous from standpoint of flux transfer efficiency to shield all parts of the head except tip 913 by placing a magnetic shield around the core.

Flux components $\phi_{a1}$ and $\phi_{b1}$ may be shown for any instant of time to be in the same or opposite directions in the core, dependent on the direction of current flow in the coils and the direction of winding of the coils. Components $\phi_{a3}$ and $\phi_{b3}$ represent the displacement flux condition that electrifies the cavity surface and may also for like reasons also be in the same or opposite directions. However, the portions of the convection flux exiting the cavity are in the same direction irrespective of the flux states of the other flux components.

Coil $L_w$ which is responsive to a carrier frequency signal, may be resonated at the carrier frequency by means of effective series capacitance $C_o$, effective equivalent shunt capacitance $C_p$, and/or by distributed capacitance $C_d$ in the carrier frequency coil itself. Distributed capacitance may be designed into coil $L_w$ by using metallic tape electrically insulated on one side, to enable forming coil $L_w$ without difficulty. A combination of flat tape and either series or shunt external capacitors may be used, as well as exclusively external capacitors, in accordance with FIGS. 2, 3 and/or 4.

Figure 2:
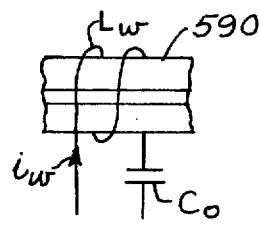
FIGS. 2, 3 and 4 show a portion of the core of FIG. 1 with the carrier frequency coil thereon, and with series capacitor, parallel capacitor and/or effective capacitance due to distributed capacitance of the carrier coil.
Figure 3:
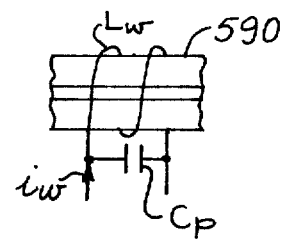
Figure 4:
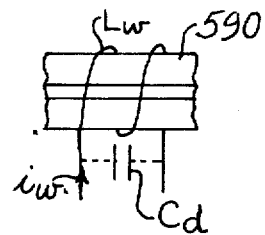

Referring to FIGS. 2, 3 and 4, a portion of core 590 of FIG. 1 is shown with coil $L_w$ integral therewith. Coil $L_w$ may either have external capacitance in series therewith or may be made of flat ribbon metal insulated on one side so that $C_o$ represents the effective series capacitance seen by looking into the coil terminals. Effective shunt capacitance of the winding of coil $L_w$ or capacitor external the coil and across the coil, $C_p$, may be used as equivalent to the effective series capacitance. When coil $L_w$ is made of flat metallic ribbon, distributed capacitance inherent in coil $L_w$ may be represented by $C_d$ which is in effect the same as $C_p$, insofar as its effect upon the inductive component of coil $L_w$. The objective of modification of FIG. 1 and subsequently discussed structures with the effective capacitance is to provide means for resonating the inductive component of coil $L_w$ at a predetermined carrier frequency, so that the reactances, inductive and capacitive, cancel each other and the coil resistance is the only limiting factor of current flow through the coil thereby providing a maximum of flux in the core. The resonant condition, whether series or parallel will provide the same result insofar as current through coil $L_w$. The distinction between series and parallel resonance is academic as this only affects the impedance to the electronic circuit to which $L_w$ is connected.

Referring to FIG. 5, magnetizable core 700 of the head has a flange 701 at the rear end thereof and holes 702 for mounting the head. Carrier coil $L_w$ as discussed in connection with FIG. 1 is integral with or formed about the outer periphery or girth of core 700, and coil $L_z$ to which intelligence signals are applied is formed about the outer periphery or girth of core 700. This core has open sidefaces so that a window 703 in core 700 is provided. Core 700 can be stamped out and manufactured cheaply. This core also has an aperture at 713 extending axially into the core and terminating at window 703. Convection flux components $\phi_{a2}$ and $\phi_{b2}$ will exit through aperture 713. Though this core may be somewhat inefficient due to flux escaping through window 703, this deficiency can be cured by utilizing a magnetic shield enveloping core 700 and flange 701 except for the narrowed tip portion which will extend from the shield so that flux may be radiated or convected through aperture 713. If desired, aperture 713 may be filled with non-magnetic material such as copper or plastic material.

Referring to FIG. 6, the sidewall window of FIG. 5 is not present. This head has magnetizable core 720 with coils $L_w$ and $L_z$ formed about its outer periphery or girth. Coils $L_w$ and $L_z$ by virtue of currents $i_w$ and $i_z$ respectively in these coils provide the fluxes discussed in connection with FIG. 1. Core 720 however has a cavity 723 internal the core and an aperture at 733 in the narrowest face of the core and constituting the terminal point of the cavity. The cavity extends into a portion of the core along its longest dimension starting at aperture 733. The fluxes created will be confined to cavity 723, except for flux components $\phi_{a2}$ and $\phi_{b2}$ comprising the recording flux. Discussion in connection with FIG. 1 of capacitances $C_o$, $C_p$ and/or $C_d$ is applicable here. Flange 721 with holes 722 for mounting this head is also provided.

Referring to FIGS. 7 and 8, core 690 is provided with aperture 613 extending axially along the length of the core, a portion of the way into the core. Windings $L_w$ and $L_z$ are similar to those discussed in connection with FIG. 1.

Providing capacitive components as integral with $L_w$, such as $C_o$, $C_p$ and/or $C_d$, to obtain resonance in the carrier circuit is accomplished here similarly as discussed in connection with FIG. 1. Aperture 613 may be partialy filled at the narrow end of the core, or even totally filled with non-magnetic material such as copper or with a plastic material. It is to be noted that these figures serve to show the flux paths a bit more clearly than FIG. 1, because of the perspective representation.

Figure 9:
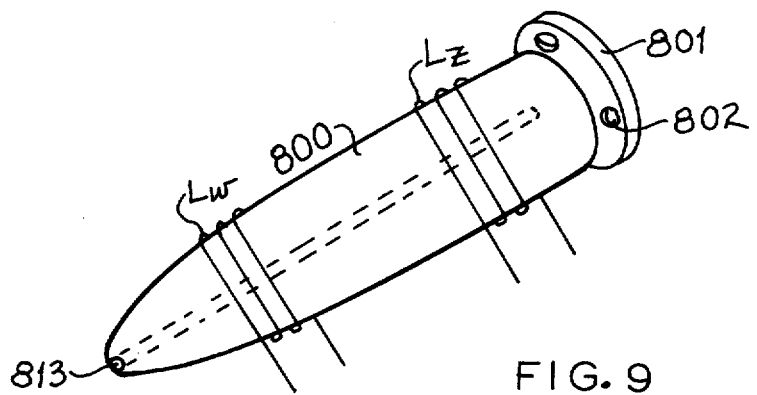
FIG. 9 is a perspective view of the head similar to FIG. 7 except that this head has a flange for mounting same and has a very narrow tip and very small diameter bore.
Figure 10:
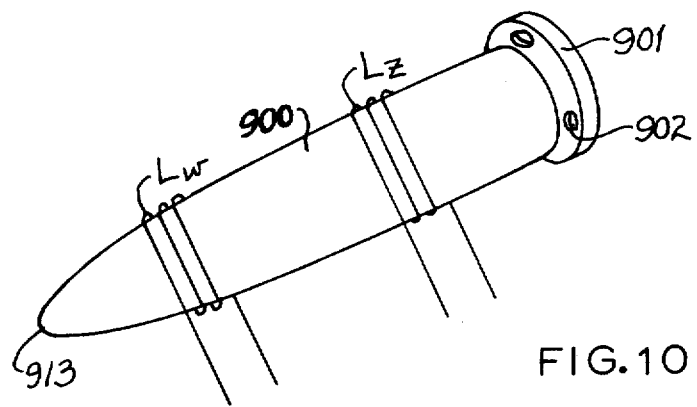
FIG. 10 is a perspective view of a head with an elongated core which is of solid magnetizable material without bore or discontinuities therein. having a mounting flange and coils formed about the outer periphery of the elongated core. This head also may use the capacitance in accordance with FIGS. 2, 3 and/or 4.

Referring to FIG. 9, a cylindrically tapered magnetizable core 800 has flange 801 with holes 802 therein for mounting the head. Core 800 has an aperture 813 extending axially partially into the core. Convective flux comprised of flux components $\phi_{a2}$ and $\phi_{b2}$ emanate from aperture 813 at the narrowed portion of the core, and used for recording the flux at an external magnetic recording surface. In this configuration, bore or aperture 813 substitutes functionally for cavities 512 or 723, or for window 703 in configurations of FIGS. 1, 6 and 5 respectively. Aperture 813 may be plugged up partially or totally with non-magnetic metallic or plastic material. This aperture may be made very small in diameter for extremely narrow track flux recording, and consequently this configuration may be readily miniaturized. The same conditions for obtaining resonance may be ustilized here by modification of the coils in accordance with FIGS. 2, 3 and/or 4 structure as discussed in connection with FIG. 1.

Referring to FIG. 10, this head comprises a non-hollowed or solid tapered magnetizable core provided at 900. Core 900 is tapered at 913. This core has coils $L_w$ and $L_z$ formed about the girth thereof, serving the same purpose as described in connection with FIG. 1. Core 900 has flange 901 at the widened end thereof with holes 902 therein for mounting the head. Since core 900 is of solid magnetizable material, the convection flux will radiate from the outer surface of the core. To overcome reduction in efficiency due to radiation other than from tip at 913, a magnetic shield may be used to envelope the core, except for tip 913 from which the convection flux will radiate for recording on external recording medium. As in the case of FIG. 1, modification of the coil structure in accordance with FIGS. 2, 3 and/or 4 as part of $L_w$, will further increase the efficiency of the head due to resonance.

Figure 11:
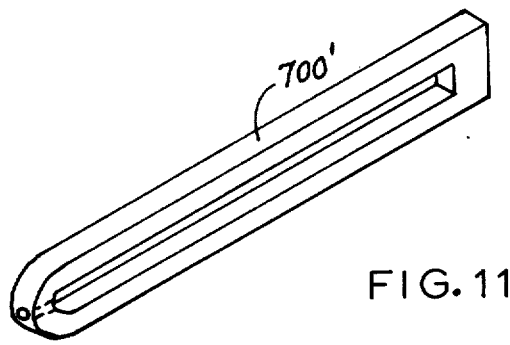
FIG. 11 is a perspective view of a magnetizable core usable instead of the core in FIG. 5.

Referring to FIG. 11, the core of FIG. 5 may be replaced by core 700'. Hence, the head resulting will function in same manner as described in connection with FIG. 5. The essential difference here is that coil winding on core 700' is more uniform because the taper of the core is only at the end thereof.

Figure 12:
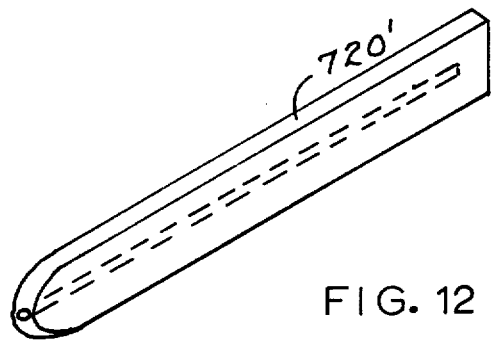
FIG. 12 is a perspective view of a magnetizable core usable instead of the core of FIG. 6.

Referring to FIG. 12, the core of FIG. 6 may be replaced by core 720'. Hence, the head resulting will function in same manner as described in connection with FIG. 6. The essential difference here is that coil winding on core 720° is more uniform because the taper of the core is only at the end thereof.

With respect to FIGS. 7, 8, 9 or 10, though the cores shown therein are illustrated as cylindrical with a taper at one end of each, these cores may be eliptical in shape, rectangular, or any other shape desired.

Referring to FIGS. 5 and 10 it may be seen that flux transfer efficiency of these structures could be improved by a magnetic shield enveloping all but the tip of the cores.

Referring to FIGS. 1, 6, 7, 8 and 9, it may be seen that these head structures are self-shielding by virtue of the core configurations.

Referring to FIGS. 1–12, the inductive component of coil $L_w$ and coil $L_z$ will be such so that the coefficient of coupling therebetween will lie in the range between 0.9 and 1. Particularly where coil $L_w$ does not have its reactive components at resonance to a predetermined carrier frequency, or where the heads are not modified in accordance with FIGS. 2, 3 and/or 4, the response characteristics will be similar to those shown in FIG. 21 of the incorporated reference, except that higher magnitudes of flux will be produced by the heads of this specification. The pulse performance characteristics as functions of pulse width will be steeper than those shown in FIGS. 22–29 of the incorporated reference, and the pulse drop-off rate will be faster with these heads than with the heads in the incorporated reference. When $L_w$ is modified to include the means employed in FIGS. 2, 3 and/or 4, that is, to provide the resonance condition in the carrier coil circuit, then the pulse response characteristics will be similar to those shown in FIG. 35 of the incorporated reference, and the coefficient of coupling will be substantially unity between inductive components, by virtue of providing flux paths for the conduction flux components, small surfaces for the displacement flux components, and narrow openings in the core permit convection flux components to be radiated from the electrified surfaces of the cores in very limited areas comprising the narrowed portions or tips of the several cores used.

In FIGS. 1–12, coils $L_w$ and $L_z$ may be wound or formed adjacent to each other about the girth of the elongated cores, or on each other with the requisite insulation either between the coils or the wire used for the coils being insulated.

The several cores illustrated may be of such shape as to lend themselves to stacking. For example, the core of FIG. 6 is narrow and thin and does not require an external shield. Such configuration may be stacked on each other. Likewise, if a lesser efficiency head can be tollerated, the core of FIG. 5 can be made less expensively because the entire core can be die stamped; this core can also be readily stacked but may require intermediate sheets of magnetic material such as iron when stacked to prevent flux interaction between the stacked heads.

Deletion of coil $L_w$ in any of the configurations, enables the use of the head as a sensor or reproduce head, with winding $L_z$ being used as the coil to which the reproduce electronics is connected. Actually coil $L_w$ does not have to be deleted for use of these heads as a reproduce type; such coil merely does not have to be used.

In FIGS. 1–12, the heads may be used for reproducing intelligence by utilizing the cores for sensing the recorded carrier bearing the intelligence, and reactance means as a tuned inductive-capacitive circuit to the already recorded fundamental of the carrier frequency. The fact that the inductive component is in resonance with the capacitive component will enable higher output to be obtained from the terminals of the reactance means that is integral with the core.

I claim:

1. A magnetic head, comprising in combination:
   a straight magnetizable one-piece core, having two ends, elongated between the two ends, and having a cavity extending only from one of the two ends into the core, said one of the two ends being a transducing area; and
   a coil formed on and circumjacent at least a portion of the core.

2. The invention as stated in claim 1, including:
   a capacitor electrically connected to the coil.

3. The invention as stated in claim 1, wherein the core is generally cylindrical.

4. The invention as stated in claim 1, wherein the core is generally rhombohedral.

5. The invention as stated in claim 1, including a winding, formed on and circumjacent at least a portion of the core, coupled to the coil.

6. The invention as stated in claim 1, including a winding, formed on and circumjacent at least a portion of the core, coupled to the coil, and a capacitor electrically connected to the winding.

7. The invention as stated in claim 1, wherein said core is tapered at least at said one of the two ends.

8. The invention as stated in claim 7, including:
   a capacitor electrically connected to the coil.

9. The invention as stated in claim 7, wherein the core is generally cylindrical.

10. The invention as stated in claim 7, wherein the core is generally rhombohedral.

11. The invention as stated in claim 7, including a winding, formed on and circumjacent at least a portion of the core, coupled to the coil.

12. The invention as stated in claim 7, including a winding, formed on and circumjacent at least a portion of the core, coupled to the coil, and a capacitor electrically connected to the winding.

* * * * *